(12) United States Patent
Kang et al.

(10) Patent No.: US 7,280,755 B2
(45) Date of Patent: Oct. 9, 2007

(54) HIGHLY UTILIZABLE PROTECTION MECHANISM FOR WDM MESH NETWORK

(76) Inventors: Minho Kang, Sejong APT 104-804, Jeonmin-dong, Yuseong-gu, Daejeon (KR) 305-728; Hong Kyu Jeong, Songwon APT 203-408, Seoseohak-dong, Wansan-gu, Jeonju-si, Chollabuk-do (KR) 560-786

( * ) Notice: Subject to any disclaimer, the term of this patent is extended or adjusted under 35 U.S.C. 154(b) by 790 days.

(21) Appl. No.: 10/672,453

(22) Filed: Sep. 26, 2003

(65) Prior Publication Data

US 2005/0071484 A1    Mar. 31, 2005

(51) Int. Cl.
*G02F 1/00* (2006.01)

(52) U.S. Cl. .............................. 398/7; 398/57; 398/58; 370/351; 370/238

(58) Field of Classification Search ............... 398/7, 398/58, 57
See application file for complete search history.

(56) References Cited

U.S. PATENT DOCUMENTS

| | | | |
|---|---|---|---|
| 6,850,705 B2* | 2/2005 | Su et al. ................. | 398/5 |
| 6,917,759 B2* | 7/2005 | de Boer et al. .............. | 398/5 |
| 2002/0021466 A1* | 2/2002 | Abrams ...................... | 359/128 |
| 2002/0041410 A1* | 4/2002 | Patel et al. .................. | 359/124 |
| 2002/0159114 A1* | 10/2002 | Sahasrabuddhe et al. ... | 359/117 |
| 2003/0229807 A1* | 12/2003 | Qiao et al. .................. | 713/200 |
| 2004/0004938 A1* | 1/2004 | Buddhikot et al. ......... | 370/238 |
| 2004/0205239 A1* | 10/2004 | Doshi et al. ................ | 709/241 |
| 2005/0025058 A1* | 2/2005 | Chaudhuri et al. ......... | 370/238 |
| 2005/0031339 A1* | 2/2005 | Qiao et al. .................. | 398/4 |

* cited by examiner

*Primary Examiner*—Kenneth Vanderpuye
*Assistant Examiner*—Thi Q. Le
(74) *Attorney, Agent, or Firm*—Harness, Dickey & Pierce, PLC

(57) ABSTRACT

In this application, the invention is a novel heuristic mechanism of working path and backup path reservation for highly utilizable WDM mesh networks, which we call dynamic-network adapted cost selection (DAC-selection) mechanism. One of its characteristics is simple traffic distribution mechanism, and the performance of DAC-selection mechanism is superior to that of Random selection (R-selection) and Advanced Combined Min-cost selection (ACM-selection) mechanism. DAC-selection mechanism provides simple cost function by assigning proper weights to each component of the cost function and the total cost is obtained by just summing up the individual cost. Therefore, it is possible to select a best pair of working path and backup path which consumes least wavelength for reservation.

3 Claims, 12 Drawing Sheets

HIGHLY UTILIZABLE PROTECTION MECHANISM FOR WDM MESH NETWORK

BACKGROUND OF THE INVENTION

1. Field of the Invention

The present invention relates to a method for allocating network resources. More specifically, the present invention relates to an efficient method for allocating network resources using heuristic method in WDM(Wavelength Division Multiplex) network required to be protected.

2. Description of the Related Art

In the real world, 1+1 or 1:1 protection mechanism commonly has been adopted. However, the resource utilization rate of those protection schemes is at most 50% low when applied to optical mesh networks. Thus, protection and restoration are important in designing reliable optical networks and have been widely studied in the literature.

With the rapid growth in popularity of the Internet, the data network is evolving to include a lot of bandwidth-intensive network applications. Optical technologies including wavelength-division multiplexing (WDM) are being researched as well as commercially deployed as technologies that can satisfy the bandwidth requirements of the Internet today and the foreknowable future. However, in the optical network, the high capacity of a link has the problem that a link failure can potentially lead to the loss of a large amount of data. So, we need to develop appropriate protection and restoration schemes which minimize the data loss when a link failure occurs. Essentially, there are two types of fault-recovery mechanisms. If backup resources (routes and wavelengths) are pre-computed and reserved in advance, we call it protection scheme. Otherwise, when a failure occurs, if another route and a free wavelength have to be discovered dynamically for each interrupted connection, we call it a restoration scheme. A restoration scheme is usually more resource-efficient, while a protection scheme has a faster recovery time and provides guaranteed recovery ability.

From the network topology perspective, protection schemes can be classified as ring protection and mesh protection. Both ring protection and mesh protection can be further divided into two groups: path protection and link protection.

In path protection, the traffic is rerouted through a link-disjoint backup route once a link failure occurs on its working path. In link protection, the traffic is rerouted only around the failed link. Path protection usually has less resource requirement and link protection usually has lower end-to-end propagation delay for the recovered route. In this study, we consider path protection in networks with mesh topology. FIG. 1 summarizes the classification of protection and restoration schemes.

Based on whether the sharing of network resources is allowed, a protection scheme can be categorized as dedicated protection or shared protection.

In dedicated protection, different protection paths do not share common resource, which may be a fiber line, a SONET channel, a WDM wavelength or a switch. Examples of dedicated protection are SONET 1+1 protection and SONET 1:1 protection. In SONET 1+1 protection, traffic is transmitted simultaneously on two separate fibers from the source to the destination. In SONET 1:1 protection, traffic is transmitted over only one fiber at a time. For dedicated protection, the failure and activation of one protection path doesn't affect any other protection path. The provisioning of this type of protection is relatively simple, and its behavior is deterministic.

On the other hand, in shared protection, multiple protection paths may go through common resources as illustrated in FIG. 2. In this example, the solid lines are primary paths and the dash lines are protection paths. The protection paths of primary path ab and cd share common nodes e and f as well as the link between these nodes. SONET 1:N protection is a special case of shared protection, since all primary paths have the same source and destination. In shared protection, when one protection path is activated, other protection paths that share common resources with it may have to be rerouted. For instance, when primary path ab in FIG. 2 fails, protection path aefb is activated, so the protection path cefd for primary path cd has to be rerouted. On the other hand, when a common resource fails, all protection paths that share that resource need to be rerouted. In the same example, if link ef fails, new protection paths of both primary paths need to be reestablished. Therefore, shared protection is more complex to provision and maintain. Shared protection does offer one advantage over dedicated protection, i.e., it may offer higher network utilization. Assume that every path needs protection. In the dedicated case, the best network utilization would be 50%. On the contrary, for shared protection, since multiple paths share common resources, the total number of resources required for all the protection paths can potentially be much lower. There are two ways of allocating backup capacity illustrated in FIG. 3. One is static allocation method. In the network design phase, a spare capacity allocation algorithm statically allocates spare capacities for known network flows to ensure their survivability. For these flows, solving the spare capacity allocation problem (SCAP) determines their backup path (BP) and the amount of spare capacity required on this path. So, static allocation method is NP-complete. Studies in [1] fall into this category. ([1]: S. Ramamurthy and B. Mukherjee, "Survivable WDM mesh networks, part 1—protection," Proc. IEEE INFOCOM'99, vol. 2, pp. 744-751, March 1999) Said [1] develops an integer linear program (ILP) formulation which is quite effective for small network. However, for large network, heuristic algorithms may be more suitable.

The other is dynamic reservation method. In the network operation phase, a survivability admission control algorithm (SACA) dynamically reserves backup capacity. The SACA determines whether the network can fulfill the survivability requirement of each channel request and make all admission accordingly. When an incoming channel request is admitted, the SACA reserves both working and backup capacities for this channel request. Two types of SACA are in use, first one is the state-independent SACA, and second one is the state-dependent SACA. State-independent SACA makes the channel admission decision based on fixed criteria that are predetermined before the channel establishment phase. Even though the state-independent SACA requires less network information and makes real-time decisions for survivability admission, this approach has two problems: first, it is difficult to decide the optimal values of critical parameters. Second, it cannot guarantee full restoration in a single link failure. On the other hand, state-dependent SACA makes channel admission based on network status information such as the usage of working and spare capacities on each link. It dynamically evaluates whether there is enough spare capacity for ensuring the survivability of an incoming channel request.

Currently, there are [2], [3], [4], and said mechanisms are more advanced. ([2]: S. Chen et al., "An effiecient spare capacity allocation strategy for ATM survivable networks", Proc.GLOBECOM, 1996, vol. 1, pp. 442-46; [3]: L. Chen et al., "A survivability admission control mechanism for ATM networks," Proc. GLOBECOM, 1998, vol. 2, pp. 1178-83; [4]: Chi-Chun Lo et al., "A novel approach of backup path reservation for survivable high-speed networks", IEEE Communication Magazine, March 2003, pp. 146-52)

Said [2], [3], [4] will be described below;

S. Chen's algorithm [2] is in the category of state-independent SACA. As this algorithm is an approach of state-independent SACA, it has the limitations of state-independent SACA. L. Chen's algorithm [3] is in the category of state-dependent SACA. Although this algorithm overcomes the problems of state-independent SACA, it is considered only on a fully connected mesh network and causes excessive use of backup capacity. Currently, a mechanism proposed by Lo [4] made effort to enhance the drawbacks of the mechanisms on [2, 3]. However, the mechanism on [4] has remained several problems as follows:

first, in a viewpoint of algorithm, when preset link threshold is exceeded, only backup path is considered to exchange it for another backup path. It is partial way to improve total network utilization, expressed by number of blocked channel request and the number of used wavelengths for reserving working path and backup path, because the mechanism didn't regard working path when preset link threshold is exceeded. In addition, checking link threshold on the next step of deciding a best pair of working path and backup path all the time, and looking for another backup path instead of previously decided backup path by reason of excess of link threshold are complex work.

Second, in a viewpoint of performance evaluation method, evaluating the performance of mechanisms only by sharing rate in terms of backup capacity consumption is not relevant. Other valid evaluation method such as number of blocked channel request and wavelength consumption for reserving working and backup path should be considered.

Third, in the standpoint of simulation channel request bound, the paper [4] is very limited. Only single channel request is used for comparing the performance evaluation of mechanisms. Mechanisms should be simulated on the case of receiving various channel requests.

Last but not least, in the point of view of network utility, the network which consists of node with or without wavelength converter is not considered.

In this invention, most of problems pointed above are solved. Especially, we proposed two novel mechanism of reserving working path and backup path.

One is Advanced Combined Min-cost selection (ACM-selection), which is a variation of the combined min-cost selection mechanism on the paper [4]. We enhanced several drawbacks of the combined min-cost selection (CMC-selection) model by objective method, but the changes are not fundamental because ACM-selection mechanism maintains link threshold heuristic and traffic distribution mechanism working after the excess of link threshold. The changes are as follows:

first, in the CMC-selection one of working paths (WPs) in WP set is randomly selected for a WP, and link-disjoint backup paths (BPs) are considered to find a pair of WP and BP which consumes minimum wavelengths.

However, if we consider other WPs in the WP set, we are able to find a more proper pair of WP and BP which consume minimum wavelengths among all WP and BP pairs.

Second, it is possible to use traffic distribution function of CMC-selection, which is just used to find a new BP, in the initial WP and BP selection step. It happens to find several pairs of WP and BP, which consume same number of wavelengths. In this case, CMC-selection mechanism randomly chooses one of the pairs. However, ACM-selection mechanism uses traffic distribution function in the initial WP and BP selection step.

Third, in the CMC-selection mechanism WP is maintained when it finds a new BP because of the excess of link threshold. However, in the ACM-selection mechanism all WPs in the WPs are considered in the phase of finding a new BP by the reason of the excess of link threshold.

Fourth, weight-assigning method is used for reducing complexity of the mechanism. That is, when we find a pair of WP and BP in the first step, we confirm whether a link passed by BP exceeds preset link threshold, and if it exceeds, we give big weight cost.

In addition, we give weight by the number of required wavelengths for reserving WP and BP. So, we just sort the candidate pairs by the cost. It is very simple, but remarkably beneficial.

The following is the Random Selection (R-selection) mechanism used in general.

This is the commonly used model in the real world for protection and restoration. First, find shortest path for working path (WP) when randomly generated channel request is arrived at. Check the capacity of each link which WP passes by. If there is a link which has no enough capacity to allocate for WP, find another shortest path. The maximum number of iterations allowed in the step of finding WP is set to the number of shortest paths having same hop length. And then, find a link-disjoint backup path (BP). Also, the maximum number of iteration allowed in the step of finding BP is set to the number of link-disjoint BPs. If there are enough wavelengths for both WP and BP, accept channel request and allocate wavelengths. If not, reject channel request. FIG. 3.1 illustrates R-selection mechanism procedure.

And the following is the ACM-selection mechanism described shortly above, and improved from CMC-selection mechanism Although we chose CMC-selection mechanism in order to compare with our proposed DAC-selection mechanism, we enhanced CMC-selection mechanism, which is called advanced combined min-cost selection (ACM-selection) mechanism, because of many drawbacks of the CMC-selection mechanism in [4]. In other words, some of drawbacks of CMC-selection mechanism can be improved objectively with small effort, but the original characteristics are not changed. We already introduced the differences between ACM-selection and CMC-selection mechanism. So, we describe ACM-selection mechanism itself here.

FIG. 5 is about common part of ACM-selection and DAC-selection. The difference of ACM-selection and DAC-selection mechanism is cost calculation heuristics. So, the cost functions of ACM-selection and DAC-selection are expressed differently.

Common features between said ACM-selection and the invention will be described in detailed description of embodiments, and the followings are related to different features.

Said different features are related a cost function. FIG. 6 is the cost function of ACM-selection mechanism.

The summation cost can be calculated as follow formula:

$$\text{Cost}=(W_1 \times SC + W_2 \times (WC+BC) + W_3 \times TC + W_4 \times CC),$$

where $W_1 \ll W_2 \ll W_3 \ll W_4$, a kind of priority or weight, and $W_j$ is much bigger than $W_i$, where $i<j$ and $i=\{1, 2, 3\}$ and $j=\{2, 3, 4\}$ $$SC = \left(\sum_{i \in BP} R_{Sharing_i}\right)_{Averag}$$

SC (Sharing Cost) means average sharing rate cost of backup path. The goal of SC is to distribute channel request traffic into entire links of the network. So, it is possible to withdraw the load-balancing effect [4, 5, 6]. ([5]: Hongkyu Jeong et al., "A study on the resource utilization with various 1:1 protection policies on the optical networks", in Proc. COOC2003, vol. 10, no. 1, pp. 119-120; [6]: Hongkyu Jeong et al., "Load-balancing in protection switching of optical networks", COIN2003.)

The effect can fall down the number of blocked channel request and proper treatment when we think of double link failure, even though the double failure rarely happens. SC is calculated by above formula. First, add the sharing rate of each link used for BP, and divide it by the number of links. And then, average sharing rate can be obtained.

WC (Working path Cost) means the cost of reserving working path. That is, the cost is the same as the number of required wavelengths.

$$BC = \min_j (BR_j - SBR_j), j = 1, \ldots, W,$$

where $BR_j$ is required number of wavelengths for BP reservation in the jth wavelength number, $SBR_j$ is the number of sharable wavelength for BP reservation in the jth wavelength number. Therefore, BC should find the wavelength number which consumes minimum wavelengths. BC (Backup path Cost) is the number of additionally required wavelengths. It means that sharable wavelengths are not counted in for the number of required wavelengths.

$$TC = \sum_{i \in BP} L_{Exceeding_i}$$

TC means threshold cost. $L_{Exceeding}$ is 1 if number of wavelength used for previous channel requests exceeds preset link threshold, or 0 if otherwise. TC is the cost of the summation of the results after checking each link capacity allocation state. Therefore, if 3 links passed by a BP exceed link threshold, TC must be 3.

CC (Capacity Cost)=1 if there is no more wavelength to allocate on a link which WP and BP pass by. As the cost of CC is greatly big, the pair getting this cost should be the last candidate. Although this pair is selected to the best pair, this pair will not be accepted at the last step.

In conclusion of the cost function for ACM-selection, SC, WC, BC, TC, and CC are calculated and each cost is multiplied by each priority or weight. If we sum up all the costs, we can get total cost. Cost function block of ACM-selection mechanism is illustrated on FIG. 6.

SUMMARY OF THE INVENTION

In this application, the invention is a novel heuristic mechanism of working path and backup path reservation for highly utilizable WDM mesh networks, which we call dynamic-network adapted cost selection (DAC-selection) mechanism. One of its characteristics is simple traffic distribution mechanism, and the performance of DAC-selection mechanism is superior to that of Random selection (R-selection) and Advanced Combined Min-cost selection (ACM-selection) mechanism.

In addition, DAC-selection mechanism provides simple cost function by assigning proper weights to each component of the cost function and the total cost is obtained by just summing up the individual cost. Therefore, it is possible to select a best pair of working path and backup path which consumes least wavelength for reservation.

DETAILED DESCRIPTION OF THE EMBODIMENTS

The invented mechanism is Dynamic-network Adapted Cost selection (DAC-selection) mechanism. This is not a variation of CMC-selection like ACM-selection mechanism. DAC-selection radically changes the mechanism to select and reserve WP and BP including some elements of ACM-selection, which are not in the part of CMC-selection mechanism.

Figure 1:
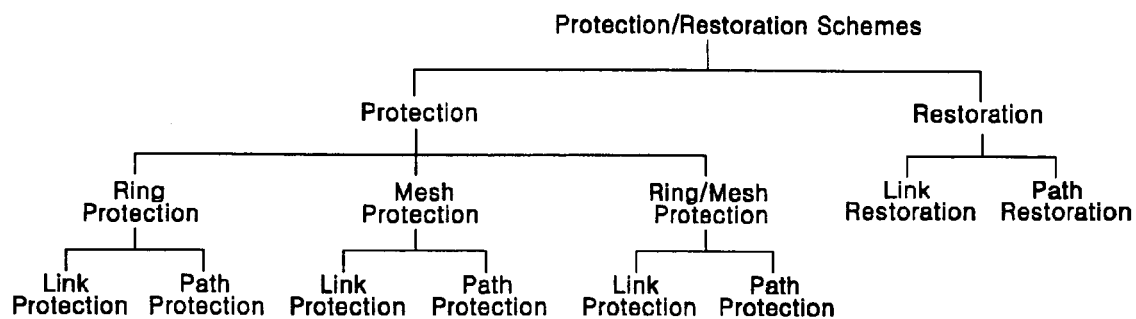
FIG. 1 is a drawing of Different Protection and Restoration schemes.
Figure 2:
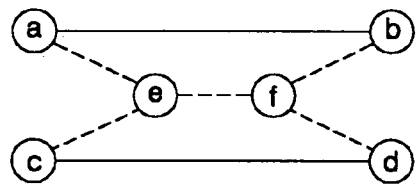
FIG. 2 is a drawing of example of Shared Protection.
Figure 3:
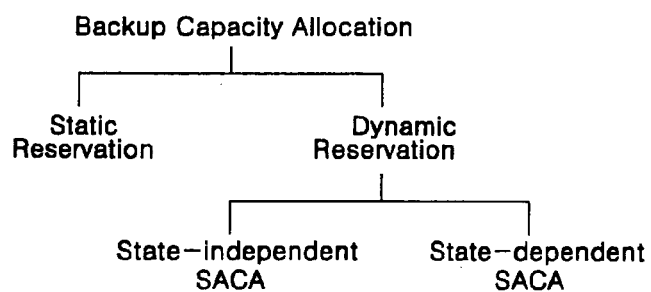
FIG. 3 is a drawing of Backup Capacity Allocation Category.
Figure 4:
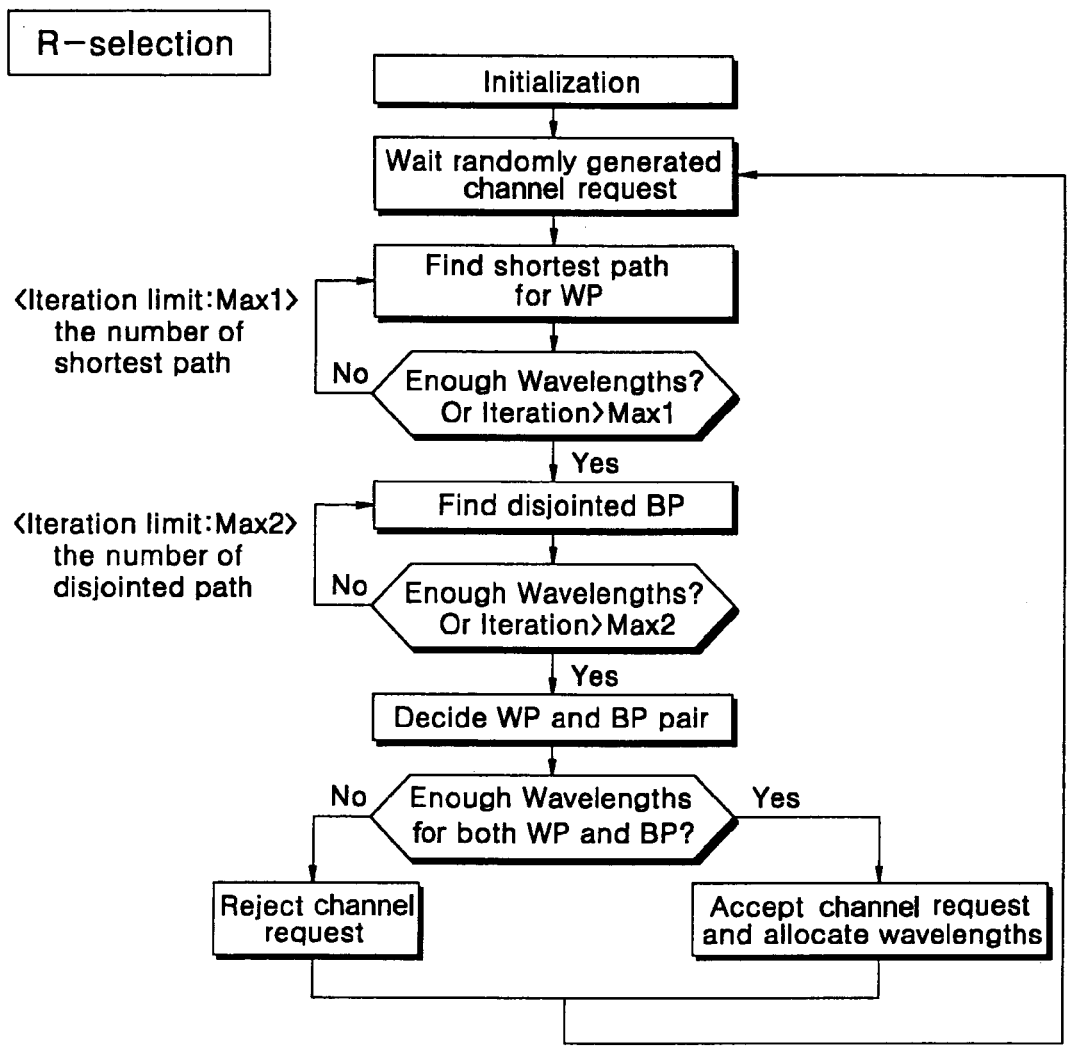
FIG. 4 is a flow chart of R-selection Mechanism Procedure.
Figure 5:
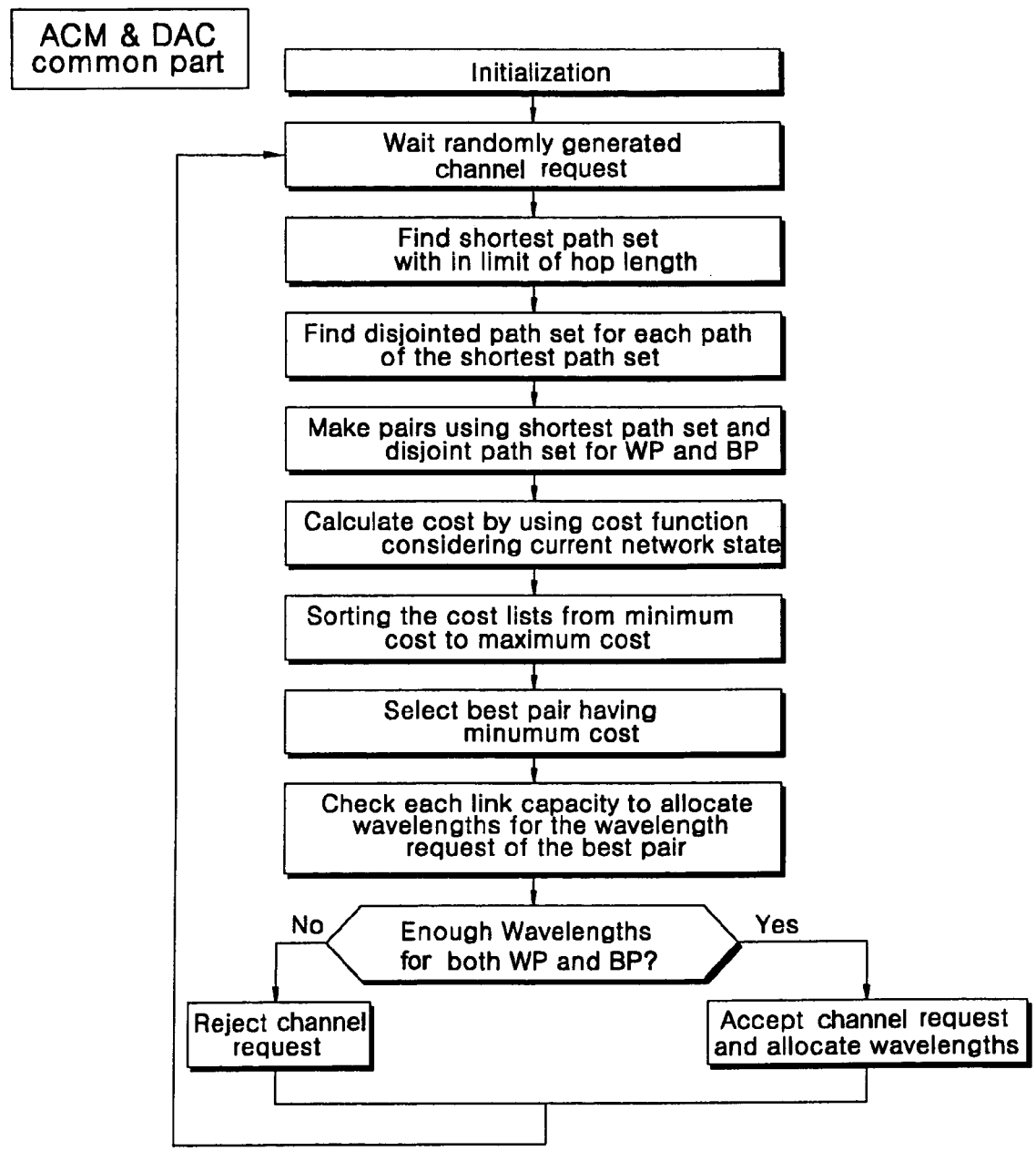
FIG. 5 is a flow chart of ACM-selection and DAC-selection Mechanism Procedure.
Figure 6:
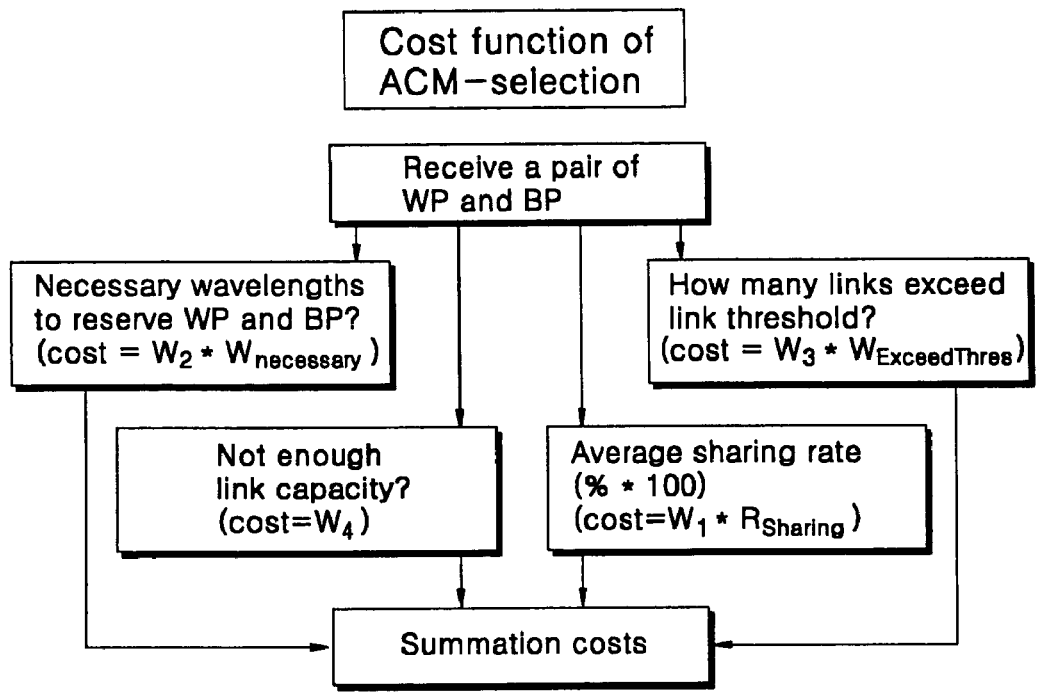
FIG. 6 is a flow chart of Cost Function Block of ACM-selection mechanism.

DAC-selection mechanism will be described below;

In FIG. 5, find shortest path and paths which have additional hop lengths less than 4. For instance, if shortest path has 3 hop lengths, a path having 7 hop lengths also can be a candidate for shortest path set. And then, find link-disjoint BP set by the same rule of building WP set.

Make pairs using both one of shortest path set and one of its disjoint paths for WP and BP. For example, there are two elements in shortest path set, one is 3→5→7, and the other is 3→8→7. Link-disjoint paths relative to the path, 3→5→7, are 3→6→8→7 and 3→2→4→7. Also, link-disjoint paths relative to the path, 3→8→7, is 3→9→7. Therefore, 3→5→7 and 3→6→8→7, 3→5→7 and 3→2→4→7, 3→8→7 and 3→9→7 can be the candidate pair for WP and BP. In a pair, each element can be the WP or BP. That is, in the 3→5→7 and 3→6→8→7 pair, the path, 3→5→7, can be considered as WP or BP. If one element is selected as a WP, the other element should be selected as a BP.

Each cost function of ACM-selection and DAC-selection mechanism finds best wavelength number for minimizing wavelength consumption considering current wavelength allocation state and it calculate the total cost. Thus, each candidate pairs get a cost which is minimum value about the WP and BP. After calculating the cost of candidate pairs, we sort the candidate pairs from minimum cost to maximum cost. And then, choose a best pair having minimum cost. The concrete contents of each cost function of ACM-selection and DAC-selection will be illustrated later on.

In the meanwhile, when this cost function finds the best wavelength number which minimizes wavelength consumption, it checks the link capacity to know whether wavelengths can be allocated for this path as the last step.

If most of candidate pairs have big cost because of limitation of each link capacity, one of the candidate pairs which pass over a link that doesn't have available wavelength is selected. In this case, the channel request is rejected at the last step of the selection procedure because even a best pair is unavailable owing to limitation of wavelength.

If there are enough wavelengths in each link for both WP and BP, we allocate wavelengths. If not, we reject the channel request.

Figure 7:
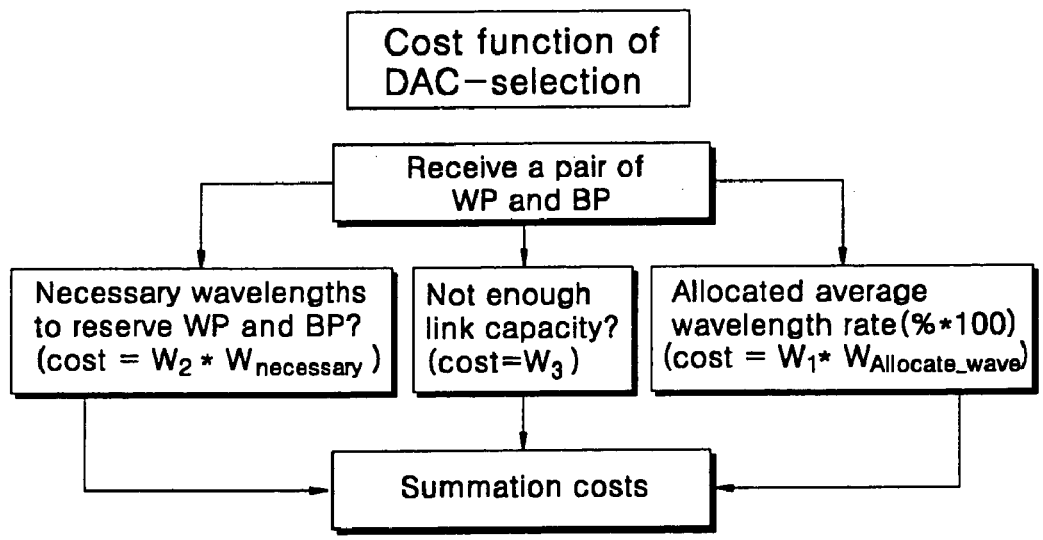
FIG. 7 is a flow chart of Cost Function Block of DAC-selection mechanism.

FIG. 7 is the cost function of DAC-selection. The summation cost can be calculated as follow formula:

$$Cost^* = (W_1 \times AC + W_2 \times (WC + BC) + W_3 \times CC),$$

where $W_1 \ll W_2 \ll W_3$, $W_j$ is much bigger than $W_i$, $i<j$, $i=\{1, 2,\}$ and $j=\{2, 3\}$, where $$AC = \left[ \sum_{i \in WP} \sum_{j \in BP} (R_{Allocated_i} + R_{Allocated_j}) \right]_{Average}$$

$R_{Allocated}$ is average rate of previously allocated wavelengths compared to total link capacity in the links passed by WP or BP. AC (Average Cost) is the cost of average link capacity allocation rate on the links passed by WP and BP. This is very simple, but powerful method. Because it is possible to evenly distribute the channel request traffic on entire network. Using this heuristic, we can derive the load-balancing effect [4, 5, 6]. Compared to the function of link threshold and average sharing rate on the ACM-selection mechanism, this heuristic method reduces the complexity by not using link threshold and just by calculating average link capacity allocation rate with the similar complexity to calculate SC of ACM-selection. Complexity computation is remained for future works.

WC, BC, and CC have the same meaning of those in the cost function of ACM-selection mechanism.

What is described below is related to simulation of this invention to be compared with referred mechanisms. For the simulation, we used two kinds of topologies, New Jersey Lata network, and 28-node US network.

First of all, three performance metrics are used to evaluate the proposed mechanism. They are:

1) Wavelength Sharing Rate:

$$R_{Sharing} = \frac{\sum_{i \in BP} R_{Total_i} - \sum_{i \in BP} R_{Used_i}}{\sum_{i \in BP} R_{Total_i}}, \text{ where } \sum_{i \in BP} R_{Total_i}:$$

Summation of total wavelengths required for reserving BP, including number of shared wavelengths $$\sum_{i \in BP} R_{Used_i}:$$

Summation of wavelengths actually allocated for reserving BP

2) Number of Blocked Channel Request

It is possible to get it just by counting the blocked channel request.

3) Number of Additionally used Wavelengths

Among R-selection, ACM-selection, and DAC-selection mechanisms, required wavelengths of DAC-selection mechanism are the base point. Thus, the number of additionally used wavelength can be the plus or minus value. That is, if the number of required wavelengths at the DAC-selection mechanism is bigger than that of other mechanism, the number of additionally used wavelength has minus value. Number of additionally used wavelength is simply calculated by counting a matrix space which is containing information of the number of wavelengths allocated for reserving WP and BP.

In this simulation, there are some assumption as below;

Each link capacity (W) is limited to 80 for New Jersey Lata network, 100 for 28-node US network, and 50 for Torus network. Because the connectivity of each network topology is different and number of nodes is various. So, we just choose proper wavelength number differently, but there is no problem even though we use same wavelength limit criterion.

Each node has or doesn't have wavelength converter. We simulated two times in the same environments, such as same topology, only changing the employment of wavelength converter. So, we make performance evaluation for each environment and compare the number of used wavelengths per each network topology.

For each experiment we run 50 times simulation, and then take average.

We simulated as increasing 50 channel request load up to 400 or 650

Figure 8:
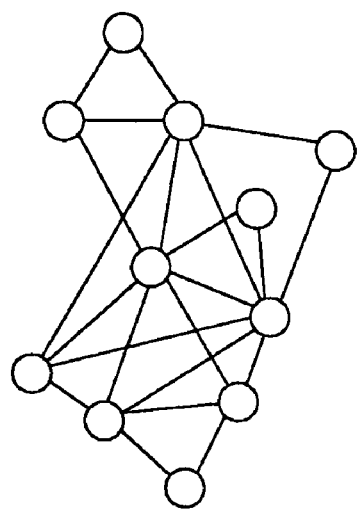
FIG. 8 is a drawing of New Jersey Lata network topology.

First of all, using New Jersey Lata network topology results of simulation are as below;

New Jersey Lata network topology consists of 11 nodes, and we first consider the network composed of the nodes with no wavelength converter. (see FIG. 8.)

Figure 9:
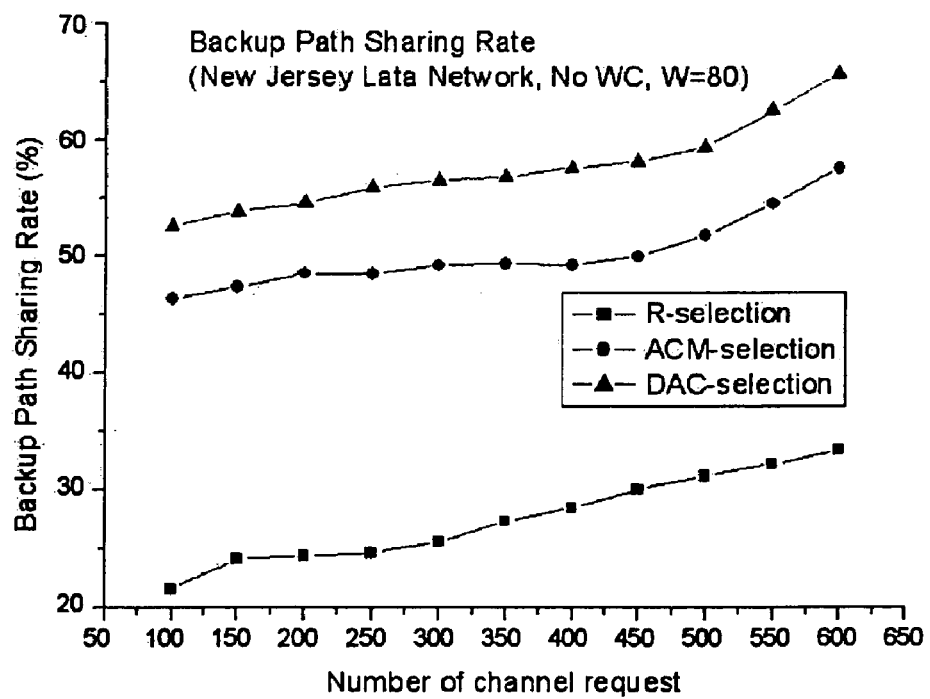
FIG. 9 is a graph of Backup Path Sharing Rate on New Jersey Lata network topology, not concerning wavelength converter

In the FIG. 9, backup path sharing rate of DAC-selection is highest among the mechanisms. As increasing channel requests, the sharing rate is growing gradually. Because the number of sharable wavelengths increases, later coming channel requests get more chances to share backup path with previously allocated backup paths. Especially, the gap of backup path sharing rate between R-selection and DAC-selection mechanism is remarkable.

Figure 10:
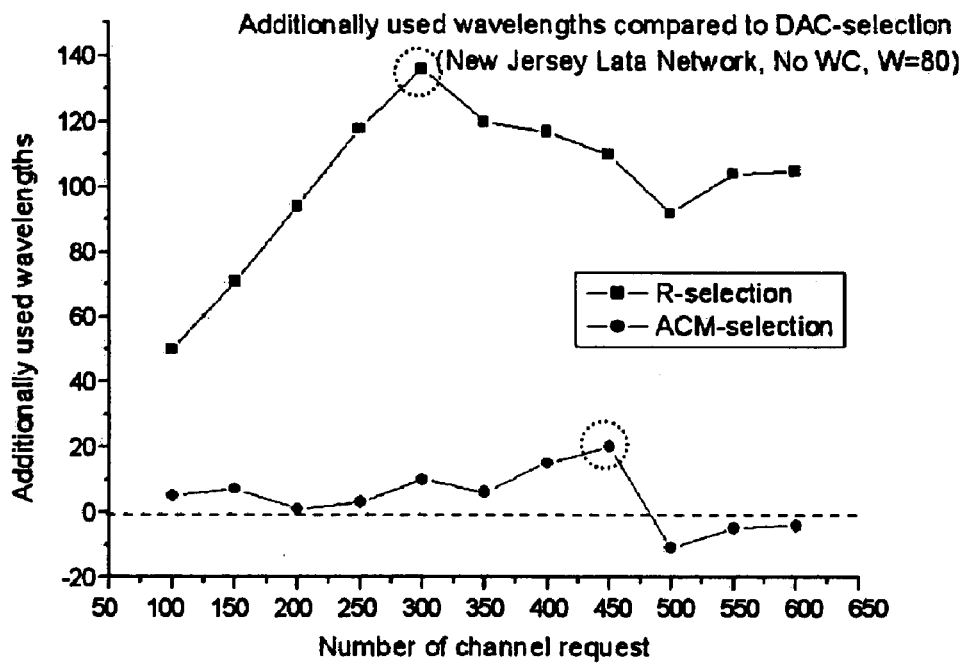
FIG. 10 is a graph of Number of additionally used wavelengths on New Jersey Lata network topology, not concerning wavelength converter.

In FIG. 10, the number of used wavelengths of DAC-selection mechanism is the base point as we mentioned before. In addition, the circles indicate the point where channel request blocking happens. So, the position of the circles can be different. In FIG. 10, we can confirm that the number of used wavelengths of ACM-selection mechanism is increasing gradually with small degree until channel request blocking happens. In the case of that of R-selection, the number of additionally used wavelengths is increasing with huge degree until it meets channel request blocking. However, if channel request blocking happens, the evaluation result of number of blocked channel request should have higher priority to evaluate the performance of mechanisms. Because number of blocked channel request shows how many channel requests the network employing a mechanism can accept without channel request blocking. In addition, if we assume there are 15 blocked channel requests. If one channel request needs 5 hop passing, we also assume that 5 wavelengths are required for WP and 3 wavelengths for BP getting 2 wavelengths saving owing to sharing BP with previously allocated BPs, which is roughly estimated. In this example, total number of wavelengths required for 15 channel requests is 120. If the channel requests increase or number of hop passing grows, total number of wavelengths required for reserving WP and BP is more augmented. Nevertheless, in the case of the situation having similar number of blocked channel request among mechanisms, the number of additionally used wavelengths is meaningful. Therefore, we can draw a conclusion about performance evaluation as follow: number of blocked channel request has higher priority as a criterion to evaluate simulation results of each mechanism. The number of additionally used wavelengths has lower priority relatively than that of number of blocked channel request, but in the case of channel request non-blocking situation and similar number of blocked channel requests, the number of additionally used wavelength can be considered significantly.

Figure 11:
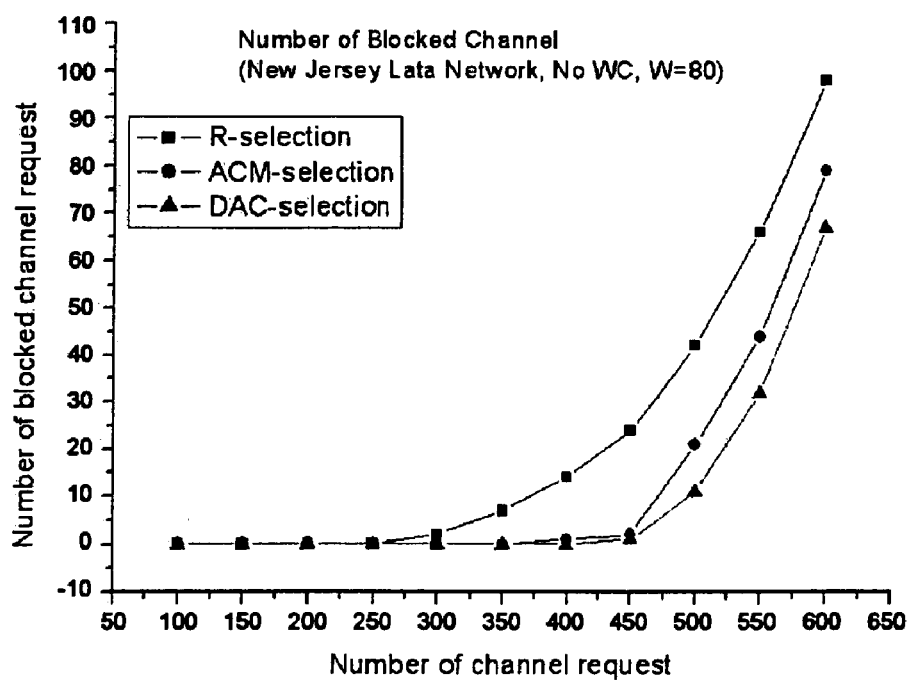
FIG. 11 is a graph of Number of blocked channel request on New Jersey Lata network topology, not concerning wavelength converter.

FIG. 11 shows the number of blocked channel request. Blocking happens at the 450 channel request in the case of ACM-selection and DAC-selection, and it grows continuously. The gap of the number of used wavelengths is much and DAC-selection mechanism has small number of blocked channel request, so we can reach a conclusion that DAC-selection mechanism has better performance than that of ACM-selection mechanism.

Next, we consider the New Jersey Lata network with the utility of wavelength converting.

Figure 12:
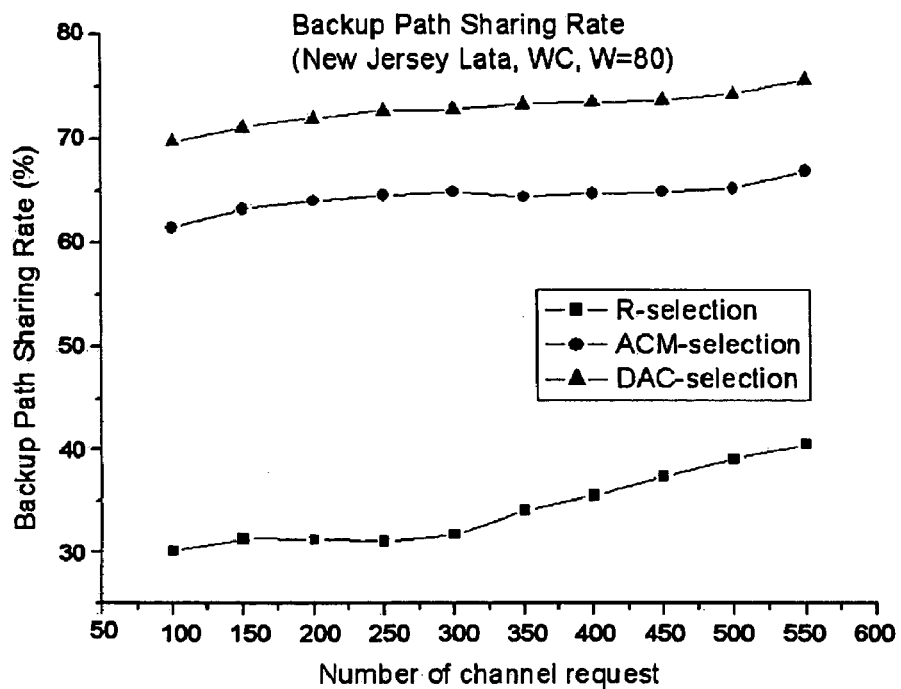
FIG. 12 is a graph of Backup path sharing rate on New Jersey Lata network topology, concerning wavelength converter.

If we use wavelength converter in the New Jersey Lata network, we can obtain higher sharing rate, compared to that of FIG. 9(see FIG. 12). Also, the gap of backup path sharing rate between ACM-selection and DAC-selection mechanism is maintained.

In addition, the gap of sharing rate between R-selection and DAC-selection mechanism is extraordinary.

Figure 13:
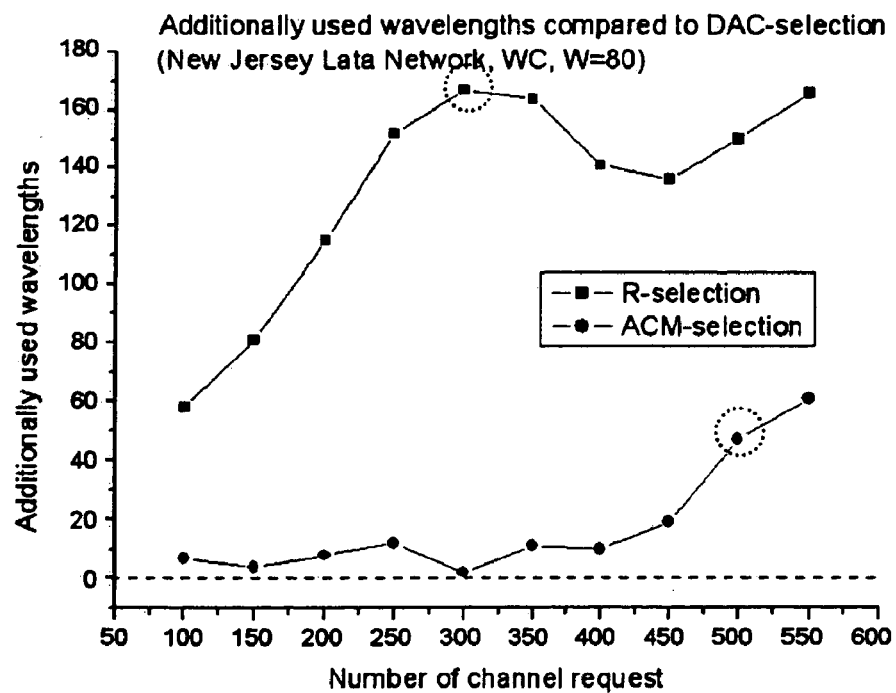
FIG. 13 is a graph of Number of additionally used wavelengths on New Jersey Lata network topology, concerning wavelength converter.

In FIG. 13, the number of additionally used wavelengths of R-selection mechanism increases, compared to that of FIG. 10. Because wavelength converter helps DAC-selection mechanism to save wavelengths while reserving backup paths. Also, before channel request blocking happens, the number of additionally used wavelengths of ACM-selection mechanism is bigger than that of ACM-selection on FIG. 10. From this result, we can know that wavelength converter makes more wavelengths saving for the DAC-selection mechanism.

Figure 14:
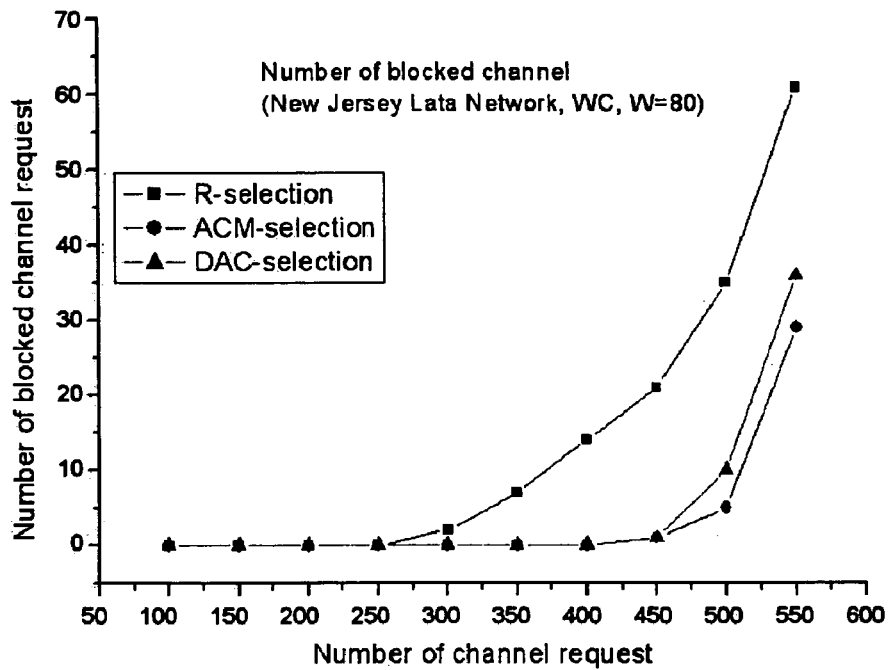
FIG. 14 is a graph of Number of blocked channel request on New Jersey Lata network topology, concerning wavelength converter.

In FIG. 14, number of blocked channel request of DAC-selection is bigger than that of ACM-selection on the 500 and 550 channel requests. However, the gap of number of blocked channel request between ACM-selection and DAC-selection mechanism is petty. On the contrary, the number of additionally used wavelengths of ACM-selection is nearly 60. Therefore, we can evaluate that DAC-selection has better performance.

Figure 15:
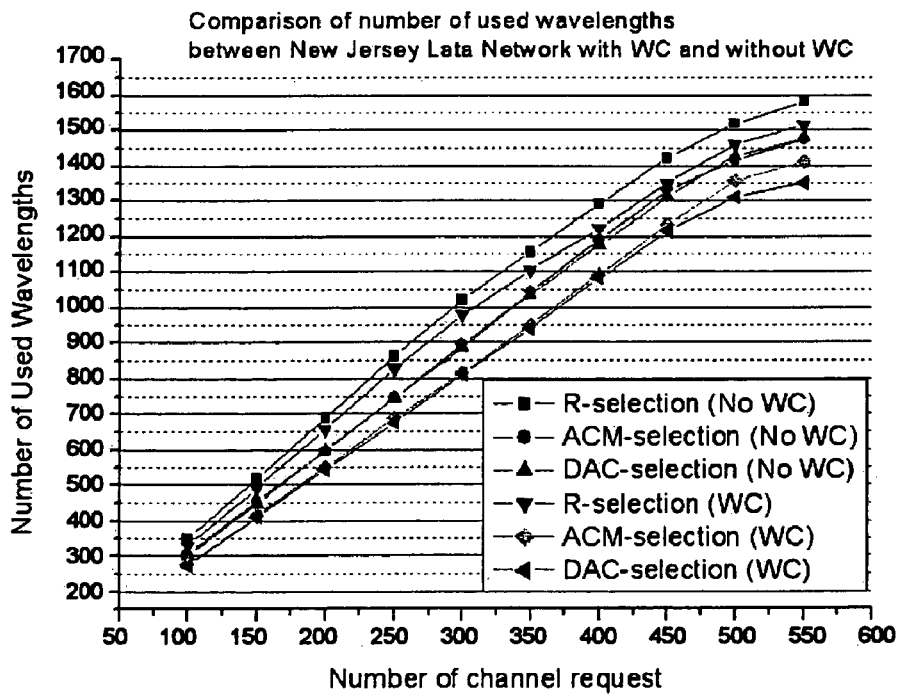
FIG. 15 is a graph of Comparison of number of used wavelengths on New Jersey Lata network topology, concerning and not concerning wavelength converter.

In FIG. 15, we can evaluate that the number of used wavelengths of every mechanism using wavelength converter is lower than that of each own mechanism which doesn't use wavelength converter. Especially, the gap of the number of used wavelengths between ACM-selection and DAC-selection mechanism is much bigger in the case of using wavelength converter.

In the New Jersey Lata network topology with no wavelength converter, DAC-selection mechanism has better performance in terms of number of blocked channel request and the number of used wavelengths, compared to that of ACM-selection mechanism. Also, in the New Jersey Lata network topology with wavelength converter, overall performance evaluation results of DAC-selection mechanism is similar to that of ACM-selection. Even though DAC-selection mechanism saves many wavelengths more than that of ACM-selection mechanism, ACM-selection mechanism gets little low number of blocked channel request that of DAC-selection mechanism.

Figure 16:
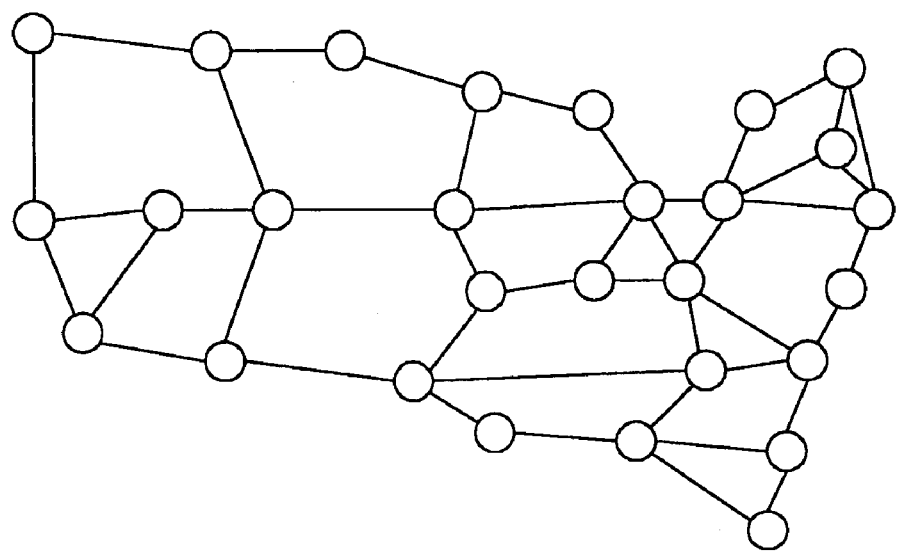
FIG. 16 is a drawing of 28-node US network topology.

Secondly, using 28-Node US network topology results of simulation are as below;

28-node US network topology consists of 28 nodes, and we first consider the network composed of the nodes with no wavelength converter.(see FIG. 16)

Figure 17:
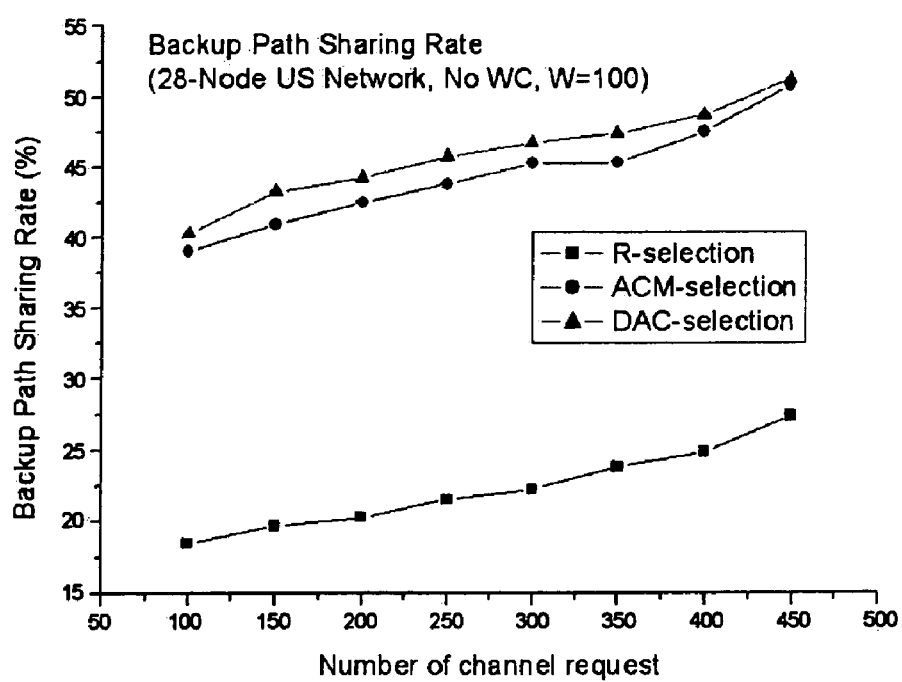
FIG. 17 is a graph of Backup path sharing rate on 28-node US network topology, not concerning wavelength converter.

In FIG. 17, the backup path sharing rate on 28-node US network is much lower than that on the New Jersey Lata network, because 28-node US network has relatively loose connectivity. Thus, the number of paths which can be selected after arriving channel requests is restricted within narrow limits. By the reason of loose connectivity, backup path sharing rate of ACM-selection and DAC-selection mechanism are similar.

Figure 18:
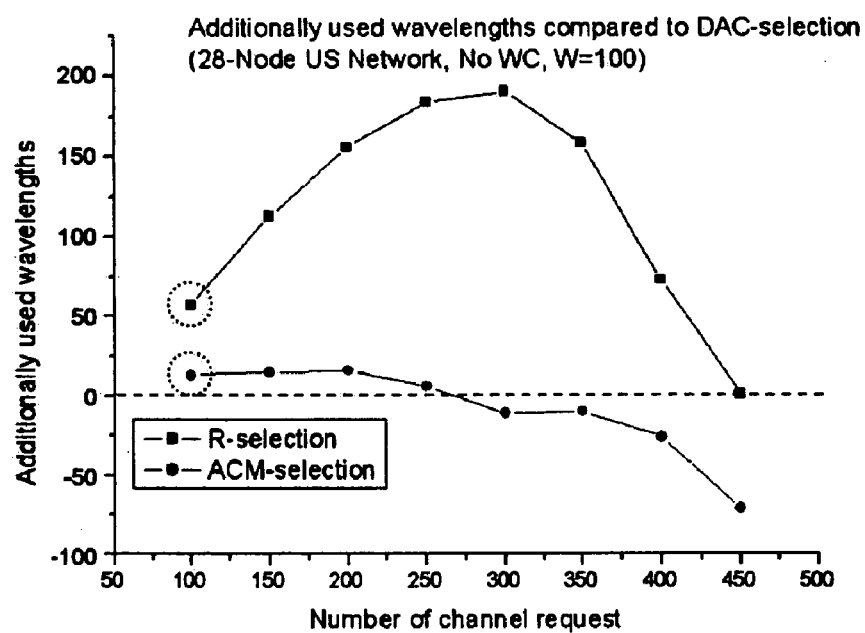
FIG. 18 is a graph of The number of additionally used wavelengths on 28-node US network topology, not concerning wavelength converter.

In FIG. 18, the blocking happens even in the 100 channel requests. Thus, in order to evaluate the performance of each mechanism, we should consider the graph of number of blocked channel request.

Figure 19:
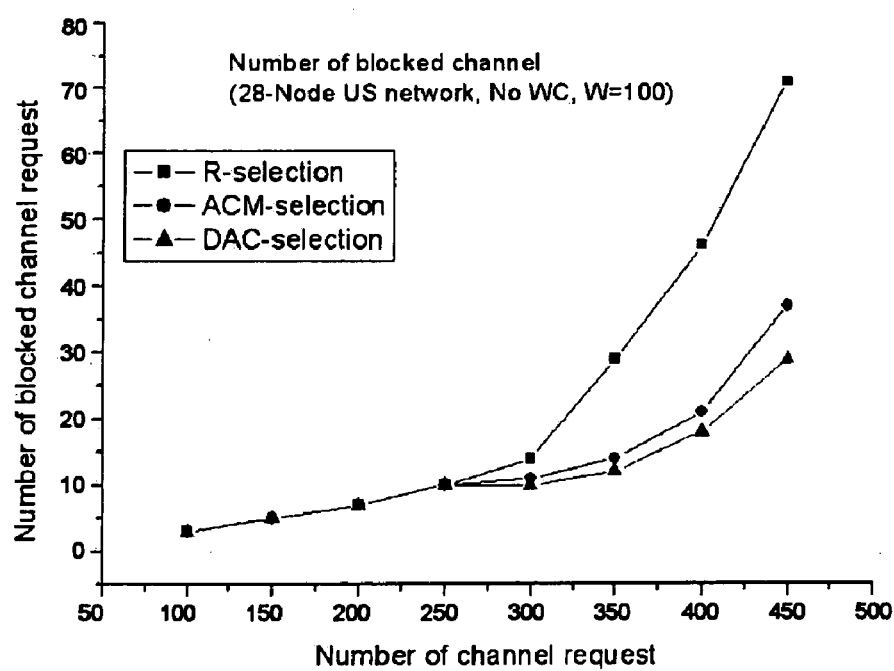
FIG. 19 is a graph of Number of blocked channel request on 28-node US network topology, not concerning wavelength converter.

In FIG. 19, the number of blocked channel request is increasing with similar degree until 250 channel requests, but the number of blocked channel request of R-selection mechanism increases extremely since the channel request is 300. As the gap of number of blocked channel request between ACM-selection and DAC-selection mechanism is over 10 blocked channel requests, we evaluate that the performance of DAC-selection mechanism is superior to ACM-selection. The gap of number of required wavelengths between ACM-selection and DAC-selection mechanism is caused by channel request blocking. That is, the point of falling down the number of required wavelengths greatly in the ACM-selection mechanism is the same point of increasing the number of blocked channel requests with much degree compared to that of DAC-selection.

Next, we consider 28-node US network with the utility of wavelength converting.

Figure 20:
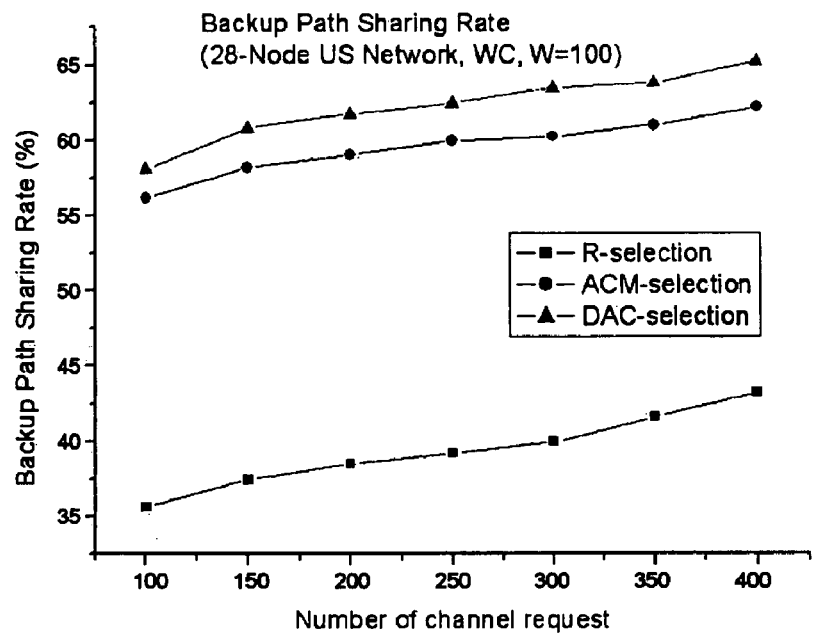
FIG. 20 is a graph of Backup path sharing rate on 28-node US network topology, concerning wavelength converter.

In FIG. 20, the backup path sharing rate is much higher than that in FIG. 17 because of the effect of wavelength converter. However, the gap of backup path sharing rate between ACM-selection and DAC-selection is similar to that in FIG. 17.

Figure 21:
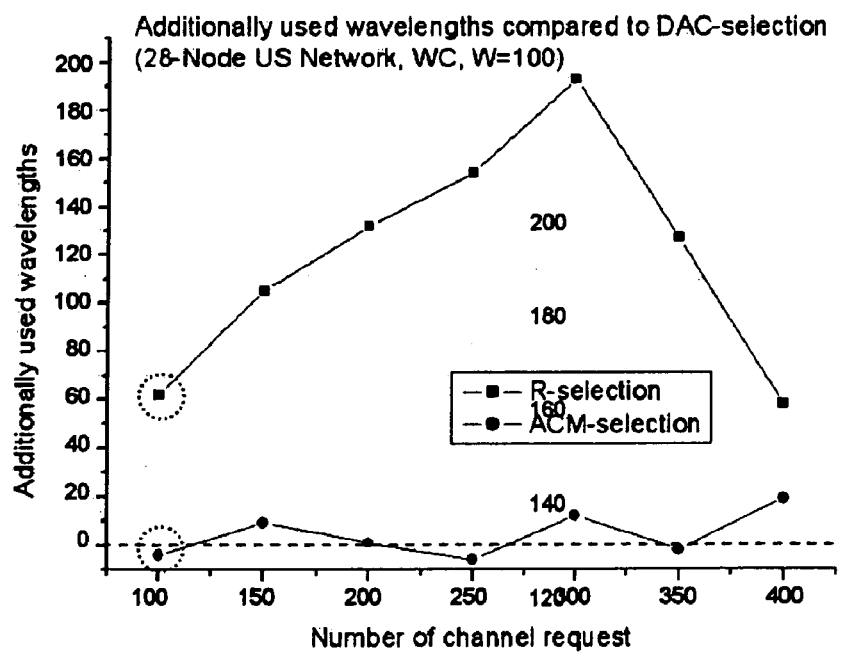
FIG. 21 is a graph of The number of additionally used wavelengths on 28-node US network topology, concerning wavelength converter.

In FIG. 21, as the blocking happens from the beginning, we should consider the graph of number of blocked channel request.

Figure 22:
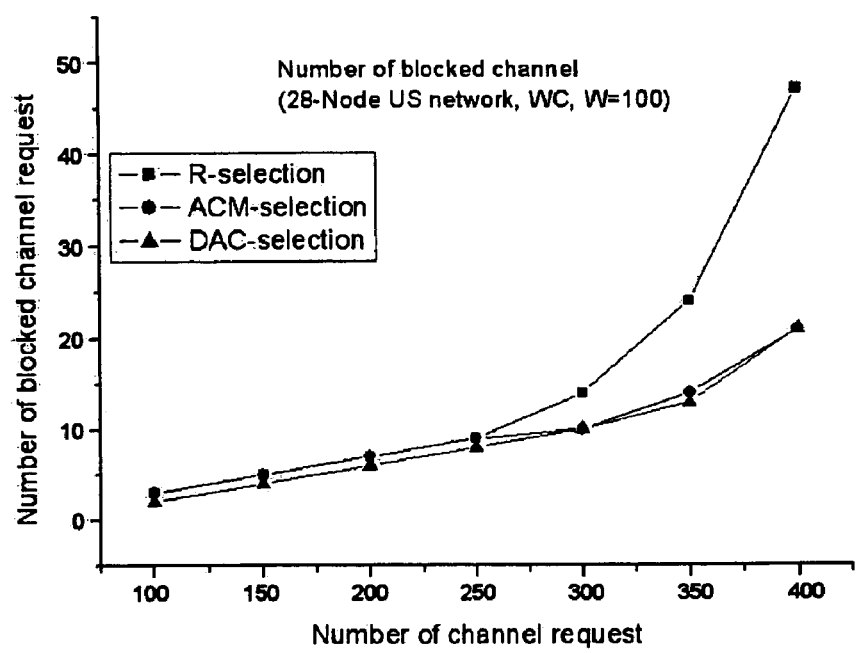
FIG. 22 is a graph of Number of blocked channel request on 28-node US network topology, concerning wavelength converter.

In FIG. 22, number of blocked channel request of ACM-selection and DAC-selection mechanism become gradually similar to each other. Furthermore, the gap of the number of required wavelengths is not enormous. Therefore, we evaluate that the performances of ACM-selection and DAC-selection mechanism are similar to each other in the case of concerning wavelength converter on 28-node US network.

Figure 23:
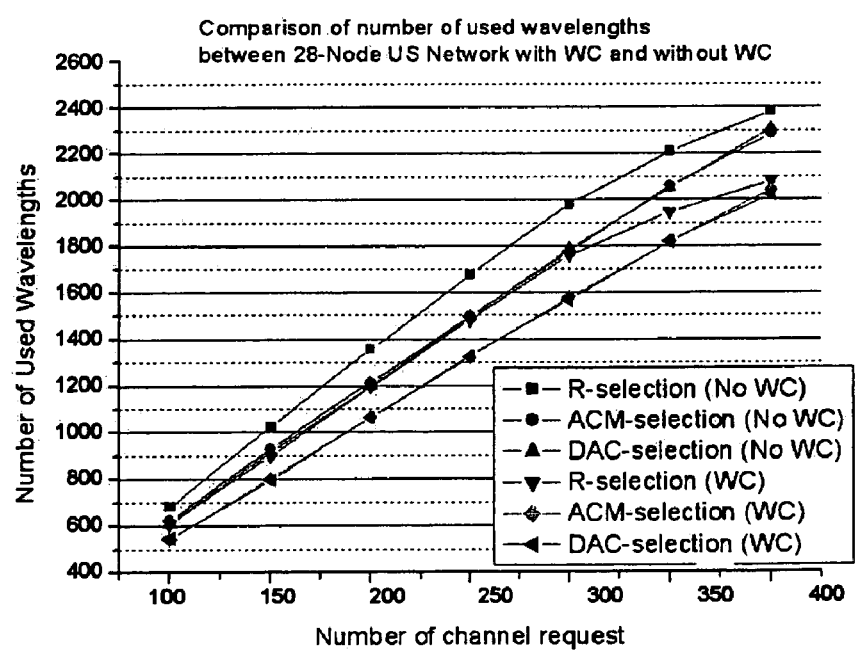
FIG. 23 is a graph of Comparison of number of used wavelengths on 28-node US network topology, concerning and not concerning wavelength converter.

In FIG. 23, we can evaluate that the number of used wavelengths of every mechanism using wavelength converter is lower than that of each own mechanism which doesn't use wavelength converter. This is caused by the reason of effect of wavelength converter.

In the 28-node US network topology with no wavelength converter, DAC-selection mechanism has better performance in terms of number of blocked channel request compared to that of ACM-selection mechanism. Also, in the 28-node US network topology with wavelength converter, overall performance evaluation results of DAC-selection mechanism is similar to that of ACM-selection, even though DAC-selection mechanism saves some wavelengths more than ACM-selection mechanism did.

What is claimed is:

1. A highly utilizable protection mechanism for WDM mesh network comprising of;
   a step of waiting randomly generated channel request which is a request to generate channel between source node and target node,
   a step of finding shortest path set within limit of hop length,
   a step of finding disjointed path set for each path of the shortest path set,
   a step of making pairs using shortest path set and disjoint path set for WP and BP,
   a step of calculating cost by using cost function considering current network state,
   a step of sorting the cost lists from minimum cost to maximum cost,
   a step of selecting best pair having minimum cost, and
   a step of checking whether each link has enough capacity to allocate channel resources for the channel request with best working and backup path pair having minimum cost,
   wherein said step of calculating cost is as follow;

$$\text{Cost}^* = (W_1 \times AC + W_2 \times (WC + BC) + W_3 \times CC)$$

where $W_1 << W_2 << W_3$, $W_j$ is much bigger than $W_i$, $i<j$, $i=\{1, 2,\}$ and $j=\{2,3\}$
   where $$AC = \left[\sum_{i \in WP} \sum_{j \in BP} (R_{Allocated_i} + R_{Allocated_j})\right]_{Average}$$

where $R_{Allocated}$ is average rate of previously allocated wavelengths compared to total link capacity in the links passed by WP or BP,
   where $$BC = \min_j (BR_j - SBR_j), j = 1, \ldots, W,$$

where $BR_j$ is required number of wavelengths for BP reservation in the jth wavelength number, $SBR_j$ is the number of sharable wavelength for BP reservation in the jth wavelength number,
   where CC (Capacity Cost)=1 if there is no more wavelength to allocate on a link which WP and BP pass by,
   where WC (Working path Cost) means the cost of reserving working path.

2. A highly utilizable protection mechanism for WDM mesh network according to claim 1,
   wherein after said step of checking whether each link has enough capacity, if a result of checking is enough wavelength for both WP and BP, then a step of accepting said channel request, and if not, then a step of rejecting said channel request.

3. A highly utilizable protection mechanism for WDM mesh network comprising of;
   a step of producing a shortest path set when channel request is generated, wherein channel request is a request to generate channel between source node and target node,
   a step of selecting disjoint path set to select working path and backup path in said path set,
   a step of calculating cost by using cost function considering current network state,
   a step of selecting best pair having minimum cost, and
   a step of allocating resources by checking whether each link has enough capacity to allocate channel resources for the channel request with best working and backup path pair having minimum cost,
   wherein said step of calculating cost is as follow;

$$\text{Cost}^* = (W_1 \times AC + W_2 \times (WC + BC) + W_3 \times CC)$$

where $W_1 << W_2 << W_3$, $W_j$ is much bigger than $W_i$, $i<j$, $i=\{1, 2,\}$ and $j=\{2, 3\}$
   where $$AC = \left[\sum_{i \in WP} \sum_{j \in BP} (R_{Allocated_i} + R_{Allocated_j})\right]_{Average}$$

where $R_{Allocated}$ is average rate of previously allocated wavelengths compared to total link capacity in the links passed by WP or BP,
   where $$BC = \min_j (BR_j - SBR_j), j = 1, \ldots, W,$$

where $BR_j$ is required number of wavelengths for BP reservation in the jth wavelength number, $SBR_j$ is the number of sharable wavelength for BP reservation in the jth wavelength number,
   where CC (Capacity Cost)=1 if there is no more wavelength to allocate on a link which WP and BP pass by,
   where WC (Working path Cost) means the cost of reserving working path.

* * * * *